US006932350B1

(12) United States Patent
Husted (10) Patent No.: US 6,932,350 B1
(45) Date of Patent: Aug. 23, 2005

(54) WINDBACK LABYRINTH SEAL THAT ACCOMMODATES A PRESSURE DIFFERENTIAL FOR ROTATING SHAFTS

(75) Inventor: Dale E. Husted, Mount Vernon, OH (US)

(73) Assignee: Ideal Electric Company, Mansfield, OH (US)

( * ) Notice: Subject to any disclaimer, the term of this patent is extended or adjusted under 35 U.S.C. 154(b) by 0 days.

(21) Appl. No.: 10/670,370

(22) Filed: Sep. 26, 2003

(51) Int. Cl.$^7$ ............................................. F16J 15/447
(52) U.S. Cl. ....................... 277/421; 277/430; 277/547
(58) Field of Search ............................... 277/412, 416, 277/418, 421, 430, 559, 547

(56) References Cited

U.S. PATENT DOCUMENTS

| | | | | |
|---|---|---|---|---|
| 808,082 | A | * 12/1905 | Fuller | 277/547 |
| 1,978,239 | A | * 10/1934 | Wheeler | 277/430 |
| 2,279,863 | A | * 4/1942 | Downer | 277/413 |
| 2,657,943 | A | * 11/1953 | Booser et al. | 384/465 |
| 3,155,395 | A | * 11/1964 | Hoffman | 277/416 |
| 3,702,704 | A | * 11/1972 | Bloch | 277/430 |
| 4,304,409 | A | * 12/1981 | Orlowski | 277/558 |
| 4,832,350 | A | * 5/1989 | Orlowski | 277/421 |
| 5,322,298 | A | * 6/1994 | Maier | 277/430 |
| 5,403,019 | A | 4/1995 | Marshall | 277/53 |
| 5,503,407 | A | 4/1996 | McNickle | 277/134 |

* cited by examiner

Primary Examiner—Alison K. Pickard
(74) Attorney, Agent, or Firm—Renner, Kenner, Greive, Bobak, Taylor & Weber (57) ABSTRACT

A segmented labyrinth seal (10) having a windback configuration formed around a rotatable shaft for preventing leakage of oil from a bearing housing having a first face (22) and a second face (23). An exterior cylindrical surface (19) and an interior cylindrical surface (18) extend between the first face (22) and the second face (23). A thread pattern (40) provided on the interior cylindrical surface (18) providing the windback configuration, and configured in a right-hand direction or a left-hand direction. A plurality of profiled teeth (41) form the thread pattern (40) and have first sides (43), second sides (44), and connecting sides (45) extending between the first sides (43) and the second sides (44). Leading edges (47) are formed where the first sides (43) join the connecting sides (45), and trailing edges (48) are formed where the second sides (44) join the connecting sides (45). The first sides (43) and the second sides (44) are slanted toward the first face (22). A pressure drop is taken over the plurality of profiled teeth (41). A channel (C) tracing the thread pattern (40) is formed between the first sides (43) and the second sides (44) of adjacent teeth of the plurality of profiled teeth (41), the channel being adapted to capture the oil from the bearing housing, and returning the oil to the bearing housing without the need for axial drain holes.

4 Claims, 5 Drawing Sheets

WINDBACK LABYRINTH SEAL THAT ACCOMMODATES A PRESSURE DIFFERENTIAL FOR ROTATING SHAFTS

TECHNICAL FIELD

The present invention relates to a segmented labyrinth seal having a windback configuration.

BACKGROUND ART

Labyrinth seals are widely used to surround rotatable shafts, and prevent leakage of oil from bearing housings. Generally, either parallel or thread-like teeth patterns are formed on the interior surfaces of these labyrinth seals. The tips of each tooth of the parallel and thread-like teeth patterns provide a radial clearance with respect to the rotatable shaft, and the channels formed between the teeth of these teeth patterns are used to capture the oil. However, even when using a thread-like teeth pattern, axial drain holes have universally been used to return the oil to the bearing housings. These axial drain holes are parallel to the axis of the rotatable shaft, and are drilled through each tooth of the teeth pattern except for tooth farthest removed from the bearing housing, the so-called terminal tooth. As such, the axial drain holes join the channels between the teeth.

The axial drain holes are intended to function to drain the oil that has migrated through the radial clearance between the rotatable shaft and the tips of the individual teeth back into the bearing housings. However, the use of axial drain holes has two limitations. First, when using axial drain holes, the pressures in the channels are equalized, and any pressure drop taken across the labyrinth seals is effectively taken entirely across the terminal tooth. Because the terminal tooth cannot withstand a significant pressure drop, these labyrinth seals cannot maintain a significant pressure drop between the interior and exterior of the bearing housing. Second, the axial drain holes actually siphon oil from the bearing housing into the channels formed between the individual teeth. Consequently, the axial drain holes actually interfere with the efficient return of the oil to the bearing housings, and contravene their very purpose.

Therefore, there is a need for additional improvements to labyrinth seals to reduce the amount of oil leakage from the bearing housings. Such improvements would eliminate the need for axial drain holes, and accommodate a significant pressure drop without adversely effecting the performance of the labyrinth seal.

DISCLOSURE OF THE INVENTION

In general, the present invention contemplates a segmented labyrinth seal having a windback configuration formed around a rotatable shaft for preventing leakage of oil from a bearing housing. The seal includes a first face and a second face with an exterior cylindrical surface and an interior cylindrical surface extending between the first face and the second face. A thread pattern is provided on the interior cylindrical surface selectively configured in a right-hand direction and a left-hand direction, the thread pattern providing the windback configuration. The thread pattern is formed by a plurality of profiled teeth having first sides, second sides, and connecting sides extending between the first sides and the second sides. Leading edges are thereby formed where the first sides join the connecting sides and trailing edges are formed where the second sides join the connecting sides. The first sides and the second sides are slanted toward the first face, and a pressure drop is taken over the plurality of profiled teeth. A channel which traces the thread pattern is formed between the first sides and the second sides of adjacent teeth of the plurality of profiled teeth, the channel being adapted for capturing the oil from the bearing housing and returning the oil to the bearing housing without the need for axial drain holes.

In accordance with another aspect of the invention, the segmented labyrinth seal has a windback configuration formed around a rotatable shaft for preventing leakage of oil from a bearing housing. The seal includes a first face and a second face with an exterior cylindrical surface and an interior cylindrical surface extending between the first face and the second face. A thread pattern is provided on the interior cylindrical surface selectively configured in a right-hand direction and a left-hand direction, the thread pattern providing the windback configuration. The thread pattern is formed by a plurality of profiled teeth having first sides, second sides, and connecting sides extending between the first sides and the second sides. The plurality of profiled teeth have a vertical tooth height, and leading edges are formed where the first sides join the connecting sides and trailing edges are formed where the second sides join the connecting sides. The first sides and the second sides are slanted toward the first face, and a pressure drop is taken over the plurality of profiled teeth. The pressure drop is from a higher pressure near the second face to a lower pressure near the first face. A channel which traces the thread pattern is formed between the first sides and the second sides of adjacent teeth of the plurality of profiled teeth. The channel is adapted for capturing the oil from the bearing housing, and returning the oil to the bearing housing without the need for axial drain holes. The labyrinth seal is adapted to accommodate the aforementioned pressure drop, and the vertical tooth height of the plurality of profiled teeth prevents the pressure drop from having adverse effects on the performance of the seal.

In accordance with yet another aspect of the invention, the segmented labyrinth seal has a windback configuration formed around a rotatable shaft for preventing leakage of oil from a bearing housing. The seal includes two half-circle shaped segments having first and second ends. When assembled, the two half-circle shaped segments form a cylindrical shape, and the first ends abut one another and the second ends abut one another. The seal also includes an exterior cylindrical surface and an interior cylindrical surface, and the exterior cylindrical surface and the interior cylindrical surface extend between a first face and a second face. A thread pattern is provided on the interior cylindrical surface, and the thread pattern is selectively configured in a right-hand direction when the rotatable shaft is rotating clockwise when looking down the rotatable shaft toward the bearing housing and in a left-hand direction when the rotatable shaft is rotating counter-clockwise when looking down the rotatable shaft toward the bearing housing. First and second split-line pins are respectively located on the first and second ends of one of the two half-circle shaped segments, and first and second holes are respectively provided on the first and second ends of the other of the two half-circle shaped segments. The first hole receives the first split-line pin and the second hole receives the second split-line pin when the segmented labyrinth seal is assembled. The position of the first hole and the first split-line pin is staggered in relation to the second hole and the second split-line pin depending on the selective configuration of the thread pattern in the right-hand direction and the left-hand direction. The thread pattern is formed by a plurality of profiled teeth having first sides, second sides, and connecting sides extending between the first sides and the second sides. The plurality of profiled teeth have a vertical tooth height, and leading edges are formed where the first sides join the connecting sides and trailing edges are formed where the second sides join the connecting sides. The first sides and the second sides respectively form first and second angles that are oblique with respect to the interior cylindrical surface, the first angle always being greater than the second angle. A pressure drop is taken over the plurality of profiled teeth, and is divided into various intermediate pressures between adjacent teeth of the plurality of profiled teeth. A channel which traces the thread pattern is wound in a direction opposite to the rotational direction of the rotatable shaft. The channel is adapted for capturing the oil from the bearing housing, and returning the oil to the bearing housing without the need for axial drain holes. The vertical tooth height of the plurality of profiled teeth is chosen to allow for a primary flow of said oil directed to the bearing housing in the channel, and to prevent secondary flow of the oil in an opposite direction to the primary flow in the channel.

A preferred exemplary segmented labyrinth seal according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
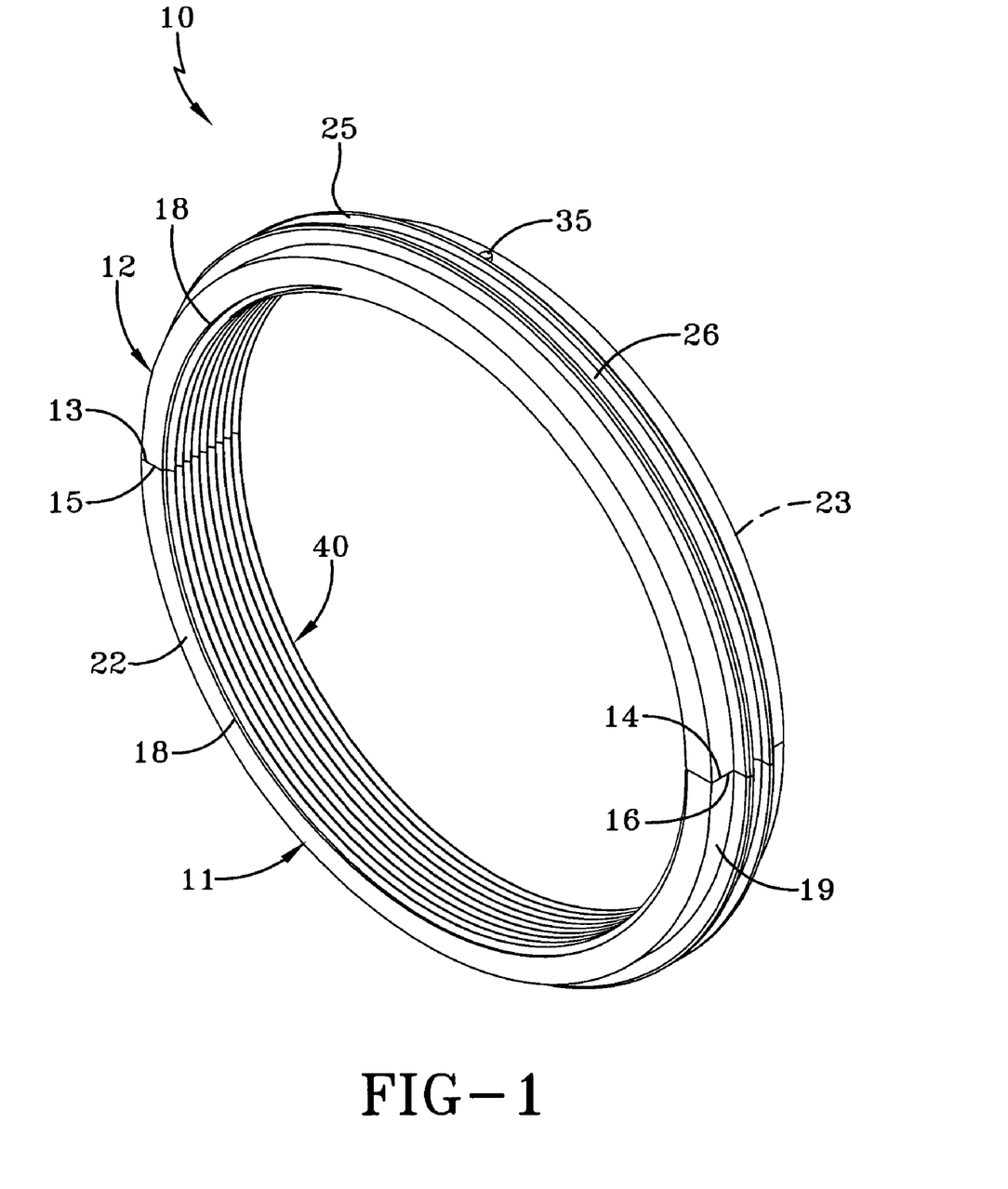
FIG. 1 is a perspective view of the windback labyrinth seal made in accordance with the present invention.
Figure 2:
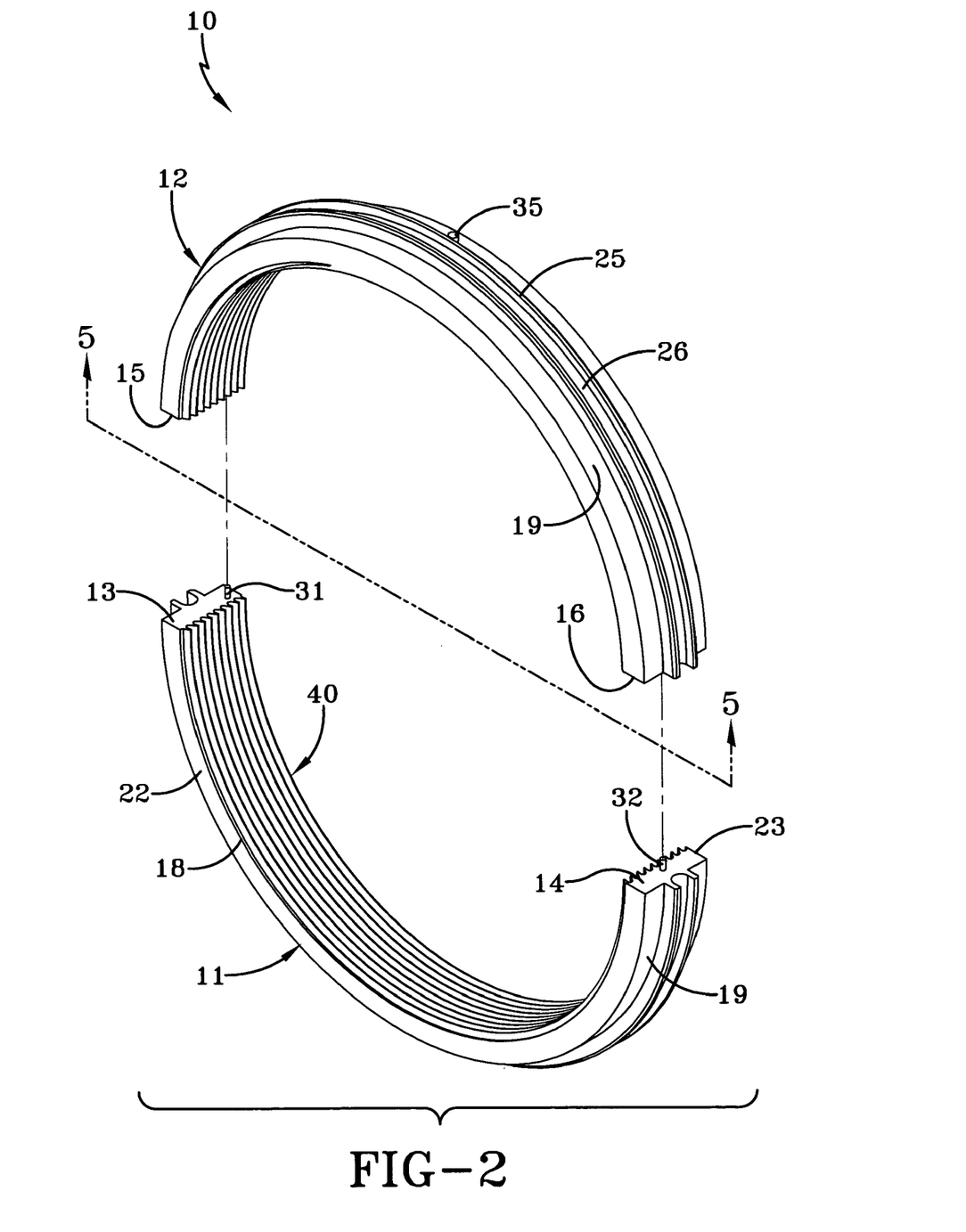
FIG. 2 is a perspective view of the windback labyrinth seal of the present invention showing it split into first and second segments.
Figure 3:
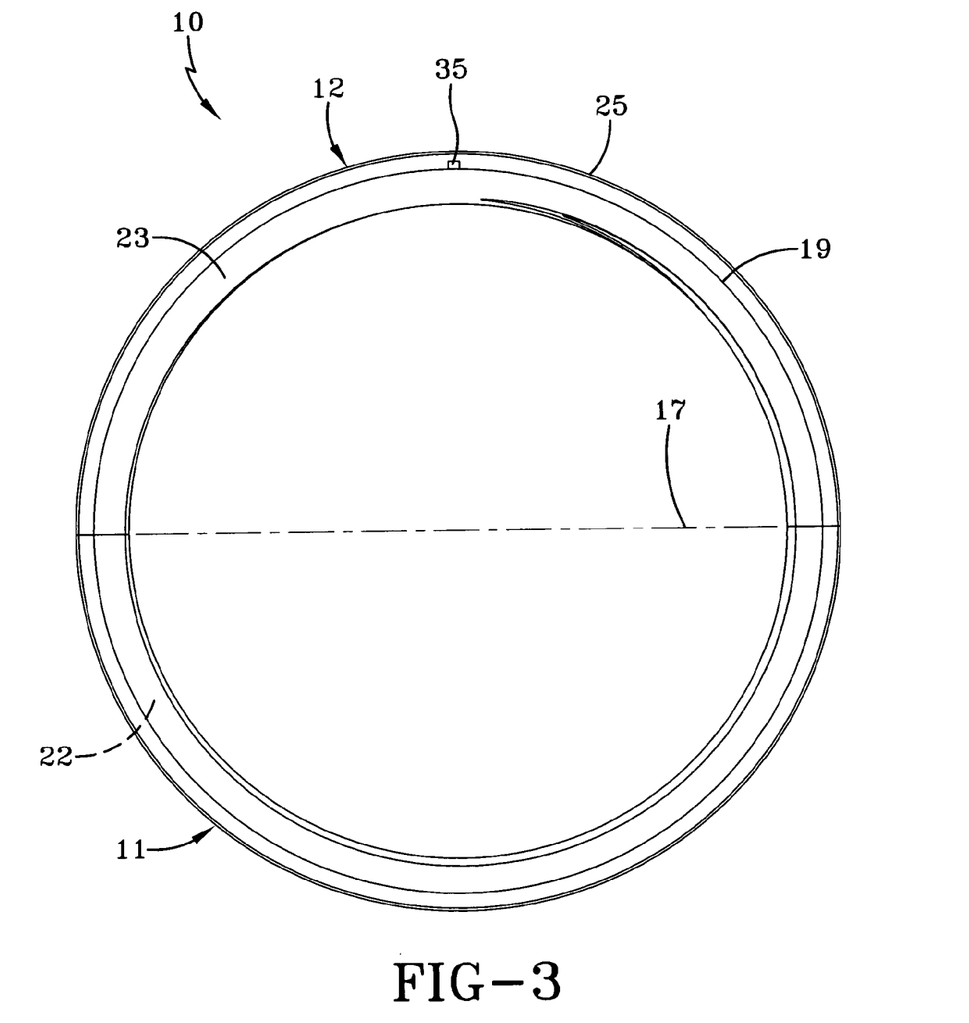
FIG. 3 is a plan view of the first face of the windback labyrinth seal of the present invention.
Figure 4:
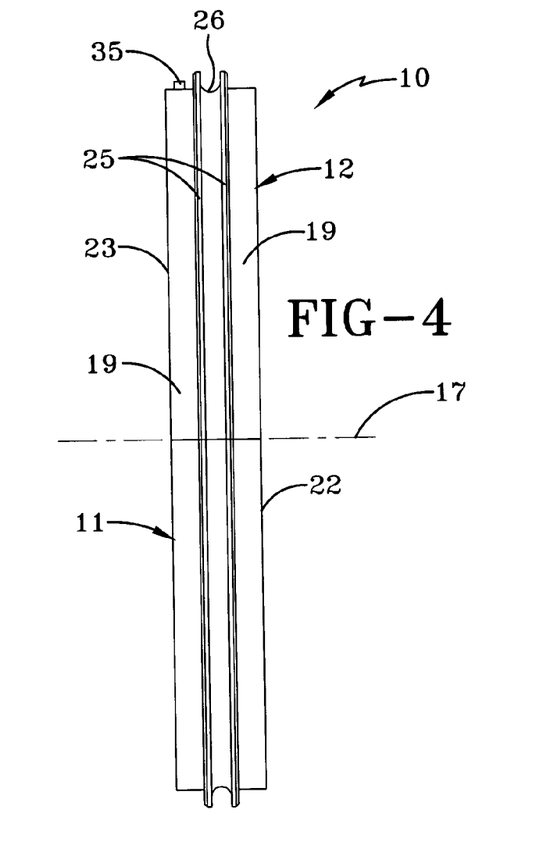
FIG. 4 is an elevational view of the exterior cylindrical surface of the windback labyrinth seal of the present invention.

Referring first to FIG. 1, the segmented labyrinth seal of the present invention is generally indicated by the numeral 10. The segmented labyrinth seal 10 can be constructed of Xiton, or other similar material and is made up of first and second half circle-shaped segments 11 and 12. As seen in FIG. 2, the first segment 11 has first and second ends 13 and 14, respectively, and the second segment 12 has first and second ends 15 and 16, respectively. First ends 13 and 15 abut one another, and the second ends 14 and 16 abut one another when the segmented labyrinth seal 10 is assembled along a split-line 17 as best seen in FIGS. 3 and 4. The split-line 17 delineates the portions of the segmented labyrinth seal 10 housed in the first half and second half of a bearing housing (not shown). As such, the first segment 11 will be housed (or encapsulated) in the first half of the bearing housing and the second segment 12 will be housed in the second half of the bearing housing.

When assembled, as best seen in FIGS. 1 and 3, the segmented labyrinth seal 10 has a cylindrical shape defined by an interior cylindrical surface 18 and exterior cylindrical surface 19, and first and second faces 22 and 23, respectively. The interior cylindrical surface 18 and the exterior cylindrical surface 19 extend between the first and second faces 22 and 23. Furthermore, when assembled, the first face 22 will be adjacent the exterior of the bearing housing and the second face 23 will be adjacent the interior of the bearing housing.

The segmented labyrinth seal 10 will be formed around a rotatable shaft (not shown), and, as discussed above, will be encapsulated in the bearing housing. To facilitate encapsulation of the labyrinth seal 10, and eventual replacement of the first segment 11 and second segment 12, the segmented labyrinth seal 10 has DIN Standard dimensions, and the exterior surface 19 is consequently provided with a profile 25. The profile 25 extends around the segmented labyrinth seal 10, and is provided with a groove 26. The groove 26 is adapted to accommodate a hoop-shaped clamping spring (not shown), and fit within the above-referenced bearing housing. The clamping spring is used to hold the first segment 11 and second segment 12 together around the rotatable shaft.

Figure 5:
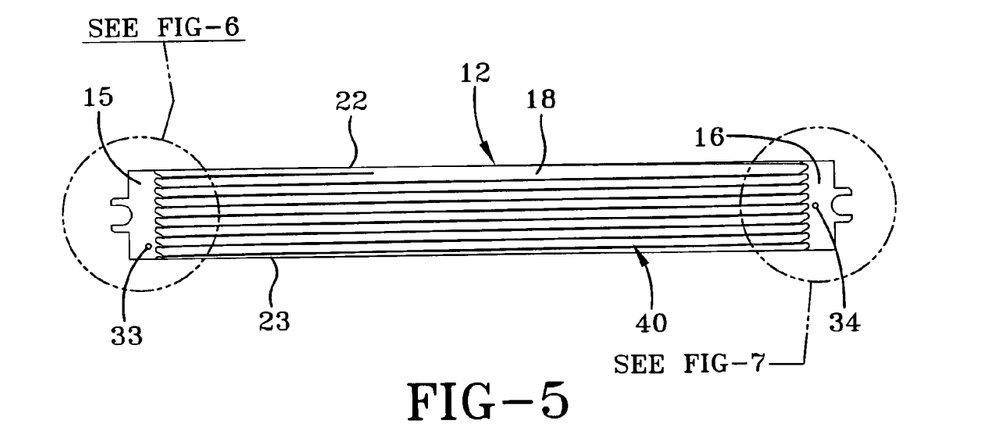
FIG. 5 is an elevational view of the first end, second end, and thread pattern on the interior cylindrical surface of the second segment as taken along line 5—5 of FIG. 2.

To aid proper assembly of the segmented labyrinth seal 10, the first and second ends 13 and 14 of the first segment 11 are provided with first and second split line pins 31 and 32 (as seen in FIG. 2). Furthermore, as seen in FIG. 5, the first and second ends 15 and 16 of the second segment 12 are respectively provided with first and second receiving holes 33 and 34. The first and second split line pins 31 and 32 are cylindrically shaped, and extend outwardly from the first and second ends 13 and 14 of the first segment 11. The first and second receiving holes 33 and 34 are adapted to receive the first and second split line pins 31, 32, and, therefore, are aligned with the first and second split line pins 31 and 32. The first and second split line pins 31 and 32 and the first and second receiving holes 33 and 34 function to maintain the cylindrical shape of the segmented labyrinth seal 10. Furthermore, as will be discussed hereinbelow, the first and second split line pins 31 and 32 and the first and second receiving holes 33 and 34 also function to insure proper assembly of the segmented labyrinth seal 10.

To prevent oil from leaking from the bearing housing, a thread pattern 40 is provided on the interior cylindrical surface 18. For example, the oil is provided in the interior of the bearing housing for lubricating the rotatable shaft within the bearings. Due to the rotation of the rotatable shaft, the oil is sprayed throughout the interior of the bearing housing, and accumulates on the rotatable shaft. The thread pattern 40 includes a plurality of profiled teeth 41 that operate to prevent the oil that accumulates on the rotatable shaft from exiting the bearing housing.

Figures 6, 7:
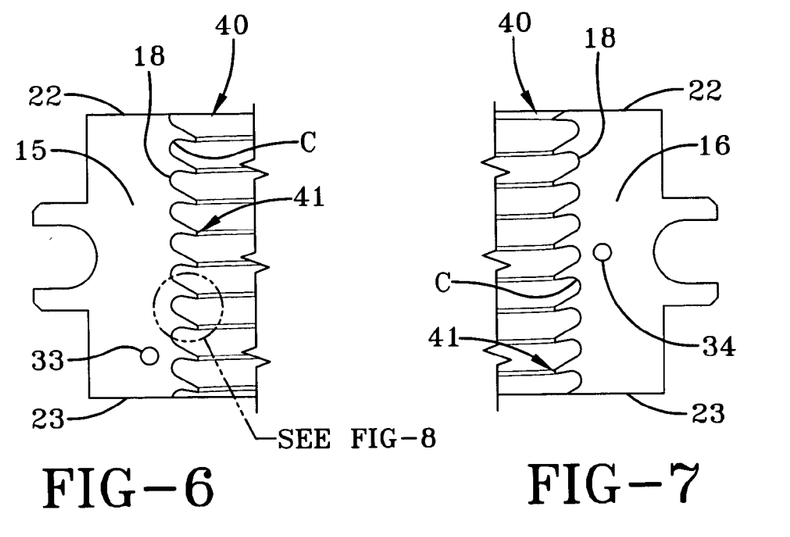
FIG. 6 is an enlarged elevational view of the first end and portion of the thread pattern of the second segment.
FIG. 7 is an enlarged elevational view of the second end and portion of the thread pattern of the second segment.

The segmented labyrinth seal 10 is unidirectional. That is, the labyrinth seal 10 is configured to prevent leakage of oil is only one direction along the rotatable shaft. As a result, depending on the rotational direction of the rotatable shaft, the thread pattern 40 has either a right-hand or a left-hand direction (or configuration). For example, if the labyrinth seal 10 is positioned on the side of the bearing housing where the rotatable shaft is rotating clockwise when the looking down the rotatable shaft toward the bearing housing, then the thread pattern 40 will have a right-hand direction, and if the labyrinth seal 10 is positioned on the side of the bearing housing where the rotatable shaft is rotating counter-clockwise when looking down the rotatable shaft toward the bearing housing, then the thread pattern 40 will have a left-hand direction. As seen in FIGS. 5–7, the labyrinth seal 40 has a left-hand direction, and would thereby be used on the side of the bearing housing where the rotatable shaft is rotating counter-clockwise when looking toward the bearing housing.

To insure that right-handed first and second segments 11, 12 and left-handed first and second segments 11, 12 are not accidently assembled, the first and second split-lines pins 31 and 32 and the first and second receiving holes 33, 34 are positioned differently depending on the direction of the thread pattern 40. For example, when the thread pattern 40 has a left-hand direction, the first split-line pin 31, and the first receiving hole 33, can be provided adjacent the second face 23 (as seen in FIGS. 2, and 5–7), and, when the thread pattern 40 has a right-hand direction, the first split-line pins 31, and the first receiving hole 33, can be provided adjacent the first face 22. As a result, staggering the arrangement (or position) of the split-line pins and the receiving holes insures that a right-handed first segment 11 would not be used in conjunction with a left-handed second segment 12 and that a left-handed first segment 11 would not be used in conjunction with a right-handed second segment 12.

In addition, depending on the configuration of the split-line pins and the receiving holes, the first ends 13 and 15, and the second ends 14 and 16 can be, if necessary, color-coded to prevent the first and second segments 11 and 12 from being installed 180 degrees out of position. For example, the ends of a right-handed labyrinth seal 10 could have one color, and the ends of left-handed labyrinth seal 10 could have another color. Therefore, the color-coding would prohibit right-handed or left-handed first and second segments 11 and 12 from being installed backwardly with respect to one another.

An anti-rotation pin 35 is provided on either the first segment 11 or the second segment 12. As seen in FIGS. 1–3, the anti-rotation pin 35 is positioned at the apex of the first segment 12, and extends radially outward from the exterior surface 19. The anti-rotation pin 35 engages a hole (not shown) in the bearing housing to prevent rotation of the segmented labyrinth seal 10 with respect to the rotatable shaft and the bearing housing.

As discussed hereinabove, the thread pattern 40 includes a plurality of profiled teeth 41 formed on the interior cylindrical surface 18 as seen in FIGS. 1, 2, and 5–7. The thread pattern 40 and the plurality of profiled teeth 41 operate to prevent the oil that accumulates on the rotatable shaft from exiting the bearing housing. For example, the radial clearance between the rotatable shaft and the plurality of profiled teeth 41 ranges from 0 to 3 mils, and is preferably between 1 and 1.5 mils. As such, the radial clearance prevents a majority of the oil from crossing the into the area of the segmented labyrinth seal 10 occupied by the thread pattern 40.

Furthermore, as seen best in FIGS. 5–9, a channel C formed between adjacent teeth of the plurality of profiled teeth 41 traces the thread pattern 40. The channel C is wound in a direction opposite to the rotational direction of the rotatable shaft. Furthermore, the channel C is adapted for capturing oil that has crossed into the area of the labyrinth seal 10 occupied by the thread pattern 40, and for returning the oil to the bearing housing without the need for axial drain holes. As such, thread pattern 40 and the channel C tracing the thread pattern 40 provides for the windback configuration of the segmented labyrinth seal 10. To that end, the channel C has a helical pattern tracing the thread pattern 40, and, consequently, is arranged in either a right-hand direction or a left-hand direction as discussed hereinabove. The helical pattern in conjunction with the rotatable shaft is used to create a primary flow to effectively return the captured oil to the interior of the bearing housing.

Figure 8:
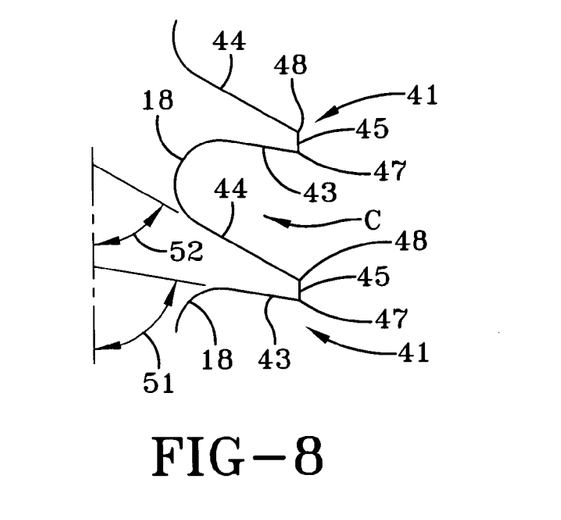
FIG. 8 is an enlarged view of the teeth of the thread pattern.

As seen in FIG. 8, each tooth of the plurality of profiled teeth 41 extend upwardly from the interior cylindrical surface 18. Moreover, each tooth of the plurality of profiled teeth 41 is slanted toward second face 23, and includes a first side 43, a second side 44 and a connecting side 45 extending between the other ends of first side 43 and the second side 44. The channel C is formed between the other end of the first side 43 and the second side 44 of adjacent teeth of the plurality of profiled teeth 41. Because the first side 43 is ultimately oriented toward the interior of bearing housing, a leading edge 47 is formed where the first side 43 joins with the connecting side 45 and a trailing edge 48 is formed where the second side 44 joins with the connecting side 45. Furthermore, as best seen in FIG. 8, the first side 43 has a steeper incline with respect to the interior cylindrical surface 18 than the second side 44. That is, the first side 43 and the second side 44 respectively form first and second angles 51 and 52 that are oblique with respect to the interior cylindrical surface 18, and the first angle 51 is always greater than the second angle 52.

Unlike prior art labyrinth seals, the segmented labyrinth seal 10 does not have axial drain holes. Because of the absence of drain holes, a relatively high pressure drop ranging from 0 to 0.45 psi can be taken across the labyrinth seal 10. For example, as discussed above, the first face 22 is adjacent the exterior of the bearing housing and the second face 23 is adjacent the interior of the bearing housing. Therefore, the pressure drop is taken from a higher pressure near the second face 23 to a lower pressure near the first face 22. However, unlike labyrinth seals provided with drain holes, the pressure drop when using the labyrinth seal 10 can be divided over each tooth of the plurality of profiled teeth 41 rather than taken entirely across the terminal tooth. As such, the pressure drop is divided into various intermediate pressures between the adjacent teeth of the plurality of profiled teeth 41, and the intermediate pressures are highest near the second face 23.

Figure 9:
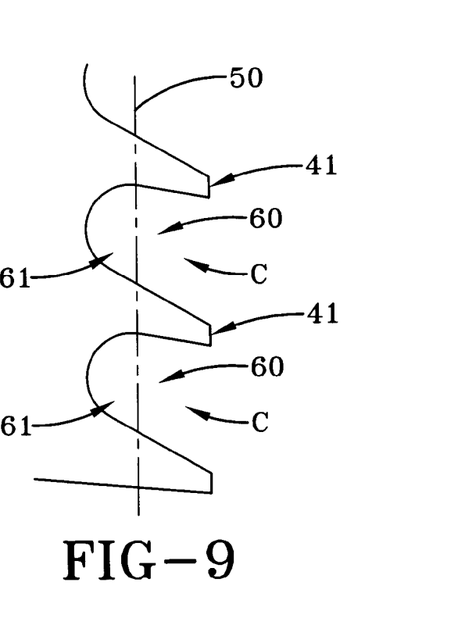
FIG. 9 is an enlarged view of the teeth of the thread pattern delineating the location of primary and secondary flows of oil around the labyrinth seal.

However, because the labyrinth seal 10 can accommodate a relatively high pressure drop, the vertical tooth height of the plurality of profiled teeth 41 must be relatively short. Otherwise, the relatively high pressure drop would cause secondary flow in the channel C. Such secondary flow would work against the above-described primary flow of the oil in the channel C. For example, as seen in FIG. 9, the portion of the oil captured in the channel C in the area above the line 50 delineated by the numeral 60 is the primary flow. As discussed above, as the rotatable shaft rotates, the primary flow is directed toward the interior of the bearing housing. The portion of the oil captured below the line 50 in the area delineated by the numeral 61 is static (or not moving), when there is no pressure drop across the labyrinth seal 10. However, when a pressure drop is taken across the labyrinth seal 10, the oil captured in the area 61 becomes the above-described secondary flow, and is compelled in a direction opposite to the primary flow. It has been found through extensive testing and development that the secondary flow can be prevented by employing the plurality of profiled teeth 41 with a relatively short vertical tooth height ranging from 0.0625 to 0.1250 inches.

As such, the absence of drain holes allows the labyrinth seal 10 to accommodate a relatively high pressure drop, and the shortened vertical tooth height of the plurality of teeth 41 prevent the relatively high pressure drop from having adverse effects on the performance of the specialized windback labyrinth seal. In fact, there is a 30% increase in capability over labyrinth seals provided with drain holes.

Thus, it should be evident that the invention disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. A segmented labyrinth seal having a windback configuration formed around a rotatable shaft for preventing leakage of fluid from a bearing housing, comprising:
   a first face and a second face;
   an exterior cylindrical surface and an interior cylindrical surface each extending between said first face and said second face;
   a thread pattern provided on said interior cylindrical surface selectively configured in a right-hand direction and a left-hand direction, said thread pattern providing the windback configuration, wherein said thread pattern has said right-hand direction when the rotatable shaft is rotating clockwise when looking down the rotatable shaft toward the bearing housing and has said left-hand direction when the rotatable shaft is rotating counter-clockwise when looking down the rotatable shaft toward the bearing housing;
   said thread pattern being formed of a plurality of profiled teeth, said plurality of profiled teeth having first sides, second sides, and connecting sides extending between said first sides and said second sides, wherein leading edges are formed where said first sides join said connecting sides and trailing edges are formed where said second sides join said connecting sides, said first sides and said second sides being slanted toward said second face, and a pressure drop is taken over said plurality of profiled teeth; and
   a channel tracing said thread pattern formed between said first sides and said second sides of adjacent teeth of said plurality of profiled teeth, said channel adapted to capture the fluid from the bearing housing, and to return the fluid to the bearing housing without the need for axial drain holes;
   wherein the segmented labyrinth seal is formed from two half-circle shaped segments, said segments having first and second ends, said first ends abutting one another and said second ends abutting one another when the segmented labyrinth seal is assembled; and
   wherein said first and seconds ends of one of said two half-circle shaped segments are respectively provided with first and second split-line pins and said first and second ends of the other of said two half-circle shaped segments are respectively provided with first and second holes, said first hole receiving said first split-line pin and said second hole receiving said second split-line pin when said segmented labyrinth seal is assembled, and the position of said first hole and said first split-line pin is staggered in relation to said second hole and said second split-line pin depending on said selective configuration of said thread pattern in said right-hand direction and said left-hand direction.

2. A segmented labyrinth seal according to claim 1, wherein at least one of said two half-circle shaped segments is provided with an anti-rotation pin, said anti-rotation pin being positioned at the apex of said at least one of said two half-circle shaped segments.

3. A segmented labyrinth seal having a windback configuration formed around a rotatable shaft for preventing leakage of a fluid from a bearing housing, comprising:
   two half-circle shaped segments having first and second ends and forming a cylindrical shape, said first ends abutting one another and said second ends abutting one another when said two half-circle shaped segments are assembled to form the segmented labyrinth seal;
   an exterior cylindrical surface and an interior cylindrical surface, said exterior cylindrical surface and said interior cylindrical surface extending between a first face and a second face;
   a thread pattern provided on said interior cylindrical surface selectively configured in a right-hand direction when the rotatable shaft is rotating clockwise when looking down the rotatable shaft toward the bearing housing and in a left-hand direction when the rotatable shaft is rotating counter-clockwise when looking down the rotatable shaft toward the bearing housing;
   first and second split-line pins respectively located on said first and second ends of one of said two half-circle shaped segments, and first and second holes respectively provided on said first and second ends of the other of said two half-circle shaped segments, said first hole receiving said first split-line pin and said second hold receiving said second split-line pin when the segmented labyrinth seal is assembled, wherein the position of said first hole and said first split-line pin is staggered in relation to said second hole and said second split-line pin depending on said selective configuration of said thread pattern in said right-hand direction and said left-hand direction;
   said thread pattern being formed by a plurality of profiled teeth, said plurality of profiled teeth having first sides, second sides, and connecting sides extending between said first sides and said second sides, said plurality of profiled teeth having a vertical tooth height, and leading edges formed where said first sides join said connecting sides and trailing edges formed where said second sides join said connecting sides, said first sides and said second sides respectively forming first and second angles that are oblique with respect to said interior cylindrical surface, said first angle always being greater than said second angle, wherein a pressure drop is taken over said plurality of profiled teeth, said pressure drop being divided into various intermediate pressures between adjacent teeth of said plurality of profiled teeth; and
   a channel tracing said thread pattern, said channel being wound in a direction opposite to the rotational direction of the rotatable shaft, said channel adapted for capturing the fluid from the bearing housing, and returning the fluid to the bearing housing without the need for axial drain holes, said vertical tooth height of said plurality of profiled teeth chosen to allow for a primary flow of the fluid directed to the bearing housing in said channel, and to prevent secondary flow of the fluid in an opposite direction to said primary flow in said channel.

4. A segmented labyrinth seal according to claim 3, wherein at least one of said two half-circle shaped segments is provided with an anti-rotation pin, said anti-rotation pin positioned at the apex of said at least one of said two half-circle shaped segments.

* * * * *